Figure 1:
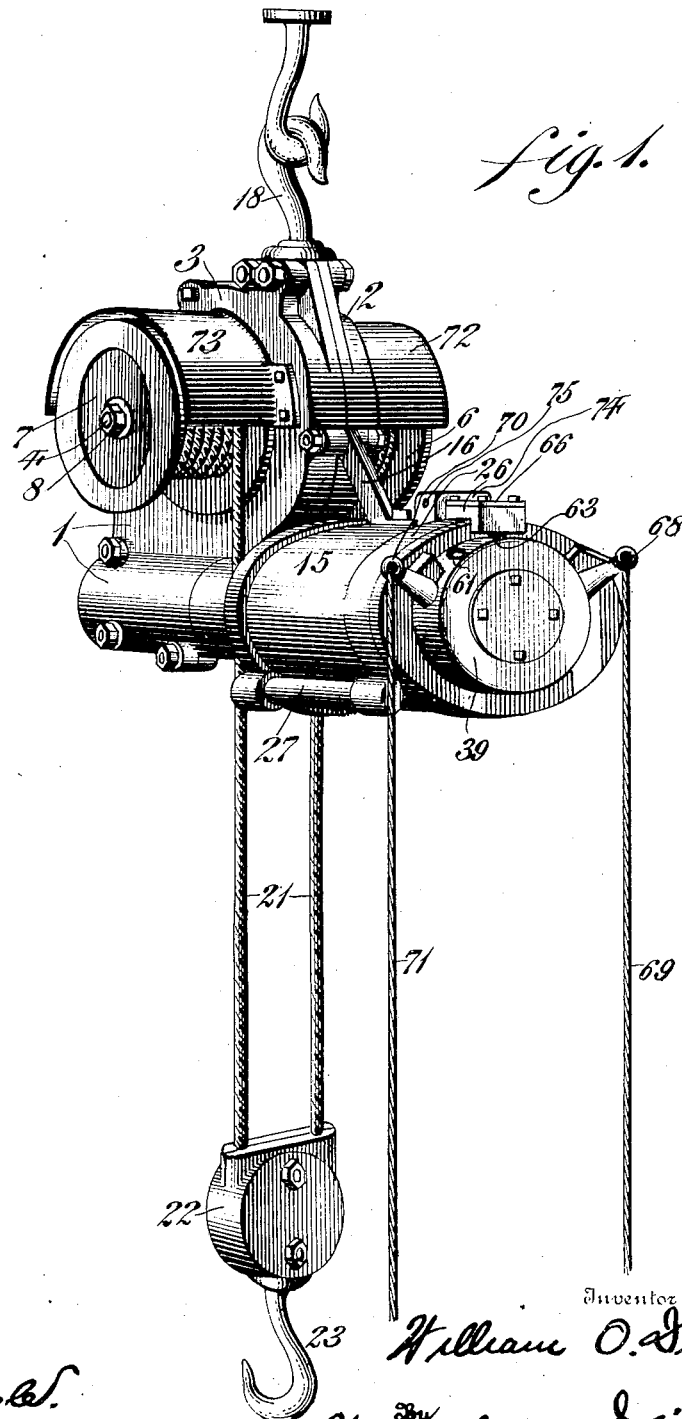

W. O. DUNTLEY.
ELECTRIC HOIST.
APPLICATION FILED JULY 30, 1907.

910,798.

Patented Jan. 26, 1909.
14 SHEETS—SHEET 1.

Witnesses
P. F. Nagle
L. Douville

Inventor
William O. Duntley
By Wiedersheim Fairbanks
Attorneys

W. O. DUNTLEY.
ELECTRIC HOIST.
APPLICATION FILED JULY 30, 1907.

910,798.

Patented Jan. 26, 1909.
14 SHEETS—SHEET 2.

W. O. DUNTLEY.
ELECTRIC HOIST.
APPLICATION FILED JULY 30, 1907.

910,798.

Patented Jan. 26, 1909.
14 SHEETS—SHEET 3.

Witnesses
P. F. Nagle
L. Douville

Inventor
William O. Duntley
By
Wiedersheim Fairbanks
Attorneys

W. O. DUNTLEY.
ELECTRIC HOIST.
APPLICATION FILED JULY 30, 1907.

910,798.

Patented Jan. 26, 1909.
14 SHEETS—SHEET 7.

Witnesses
L. Douville
P. F. Nagle

Inventor
William O. Duntley
By Wiedersheim & Fairbanks
Attorneys

W. O. DUNTLEY.
ELECTRIC HOIST.
APPLICATION FILED JULY 30, 1907.

910,798.

Patented Jan. 26, 1909.
14 SHEETS—SHEET 9.

Witnesses
L. Douville
P. F. Nagle

Inventor
William O. Duntley
By Wiedersheim Fairbanks
Attorneys

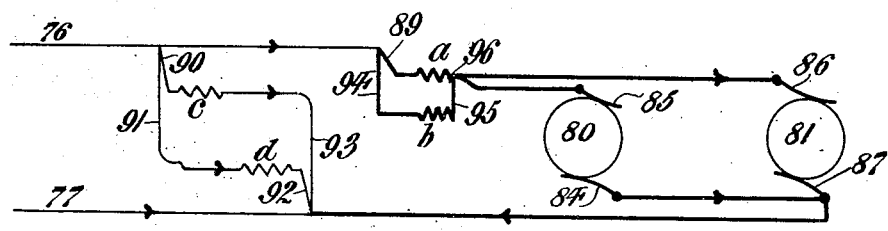
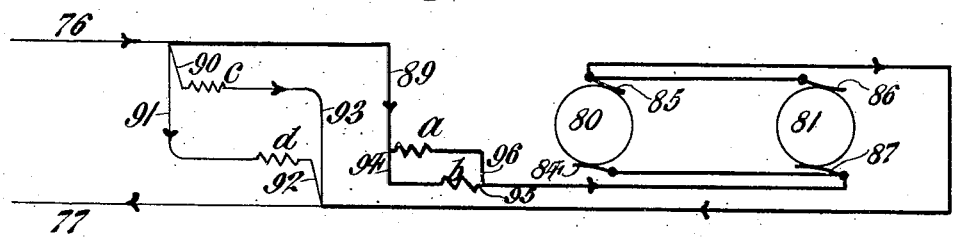
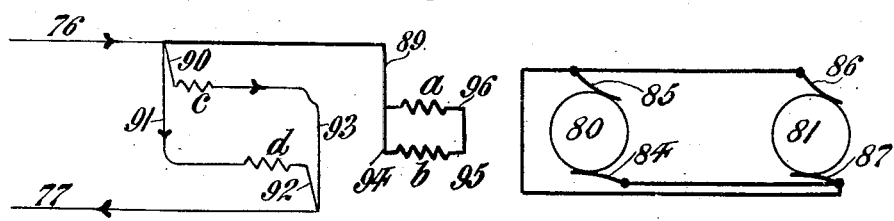

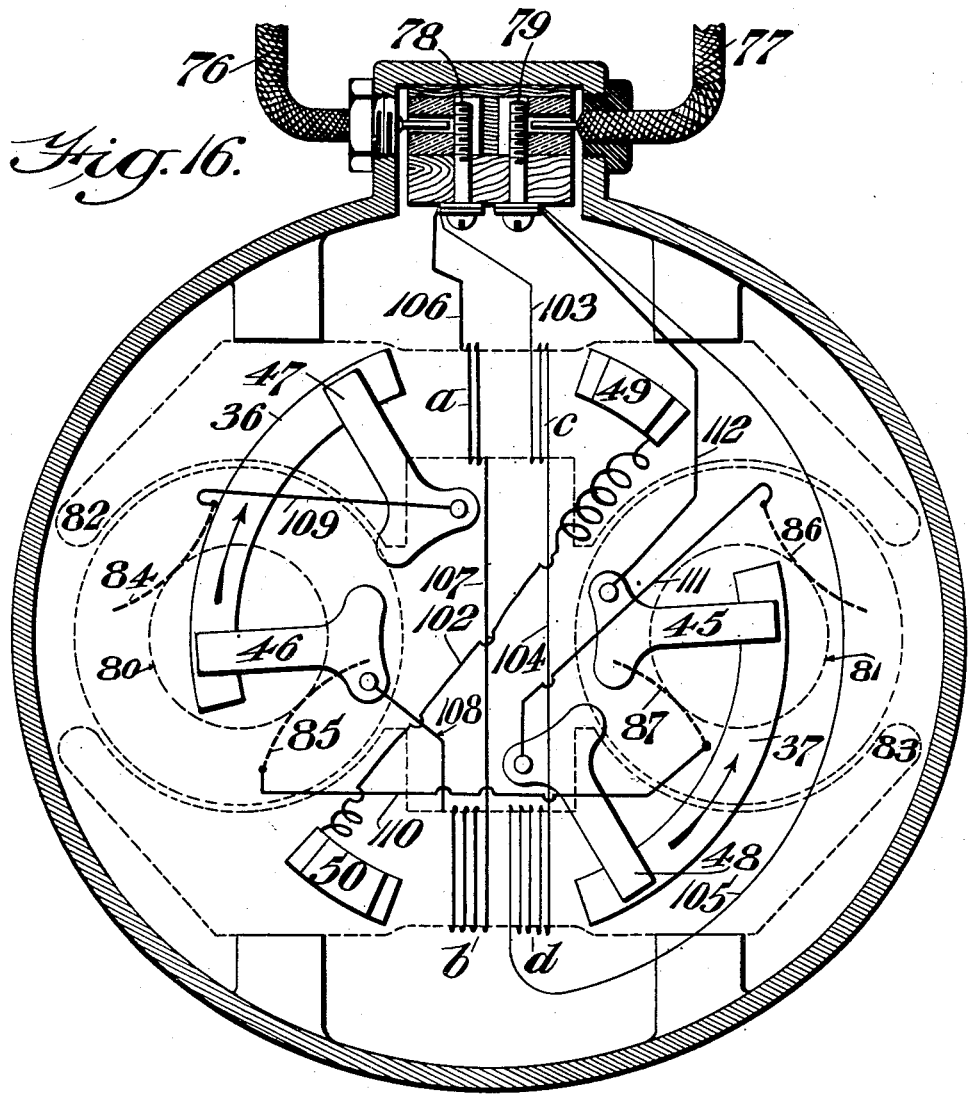

W. O. DUNTLEY.
ELECTRIC HOIST.
APPLICATION FILED JULY 30, 1907.
910,798.
Patented Jan. 26, 1909.
14 SHEETS—SHEET 13.
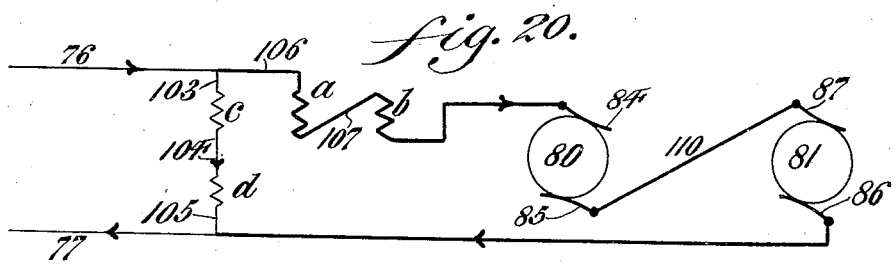
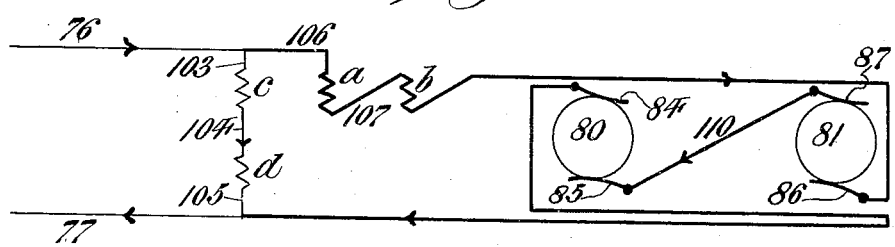
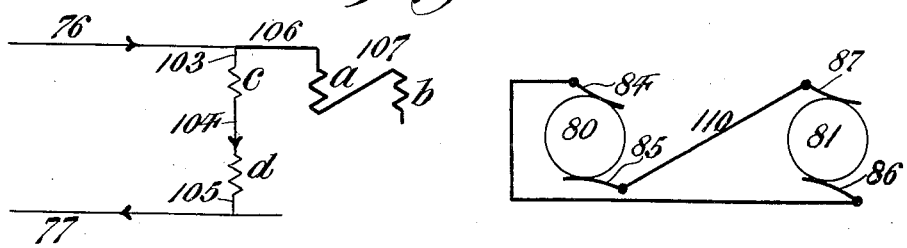
Witnesses
L. Douville
P. F. Nagle
Inventor
William O. Duntley.
By Niedersheim Fairbanks.
Attorneys

W. O. DUNTLEY.
ELECTRIC HOIST.
APPLICATION FILED JULY 30, 1907.

910,798.

Patented Jan. 26, 1909.
14 SHEETS—SHEET 14.

Witnesses
P. H. Nagle
L. Douville

Inventor
William O. Duntley
By Wiedersheim & Fairbanks
Attorneys

UNITED STATES PATENT OFFICE.

WILLIAM O. DUNTLEY, OF CHICAGO, ILLINOIS, ASSIGNOR TO CHICAGO PNEUMATIC TOOL COMPANY, OF CHICAGO, ILLINOIS, A CORPORATION OF NEW JERSEY.

ELECTRIC HOIST.

No. 910,798.　　　Specification of Letters Patent.　　　Patented Jan. 26, 1909.

Application filed July 30, 1907. Serial No. 386,240.

*To all whom it may concern:*

Be it known that I, WILLIAM O. DUNTLEY, a citizen of the United States, residing at Chicago, county of Cook, State of Illinois, have invented a new and useful Electric Hoist, of which the following is a specification.

My present invention comprises a novel construction of an electric hoist in which a plurality of motors are employed whereby I am enabled to employ motors of a lighter construction and to drive the motors at a much higher peed than is possible where a single motor is used.

It further consists of a novel and simplified construction of motor controlling mechanism which provides an accurate control of the motor under all conditions which arise in practice and by the employment of which a dynamic brake may be applied of sufficient power to bring to rest and to maintain stationary at any desired time the mechanism operated by the motors.

It further consists of novel means for automatically returning the controlling mechanism to its neutral position.

It further consists of a novel construction and arrangement of the hoist proper, the motors and the controlling mechanism which forms a concrete unitary structure of simple and compact construction and which at all times may be easily and readily controlled by the operator.

It further consists of the novel construction of hoisting mechanism with a plurality of electric motors in series or parallel, said motors having power transmission devices common thereto and to the drum shaft of said hoisting mechanism, which so far as I am aware is wholly novel with me.

It further consists of a novel controlling device for starting and reversing the motors, wherein I employ a movable bonnet, which carries contact devices, whereby the circuit is opened and closed for effecting the proper actuation of the motors according to requirements and a shunt circuit is created when a dynamic brake is to be applied.

In my novel construction I produce series fields in which the magnetism passes through each motor so that the motors run at a uniform speed.

It further consists of a novel construction of controlling mechanism in which the fields are excited or magnetized at all times.

It further consists of novel means for effecting the lubrication of the moving parts without affecting the electrical mechanism of the hoist.

It further consists of a novel construction of controlling mechanism in which all of the wires are stationary.

It further consists of a novel construction and correlation of motors and controlling mechanism therefor in which one set of wirings is employed for both 110 and 220 volts, and permitting a varied speed to be attained.

It further consists in providing suitable connections for exciting the field of the motors and short circuiting the armatures, constituting thereby an effective dynamic brake.

It further consists of other novel features of construction, all as will be hereinafter fully set forth.

For the purpose of illustrating my invention, I have shown one form of a device, since this embodiment has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 2:
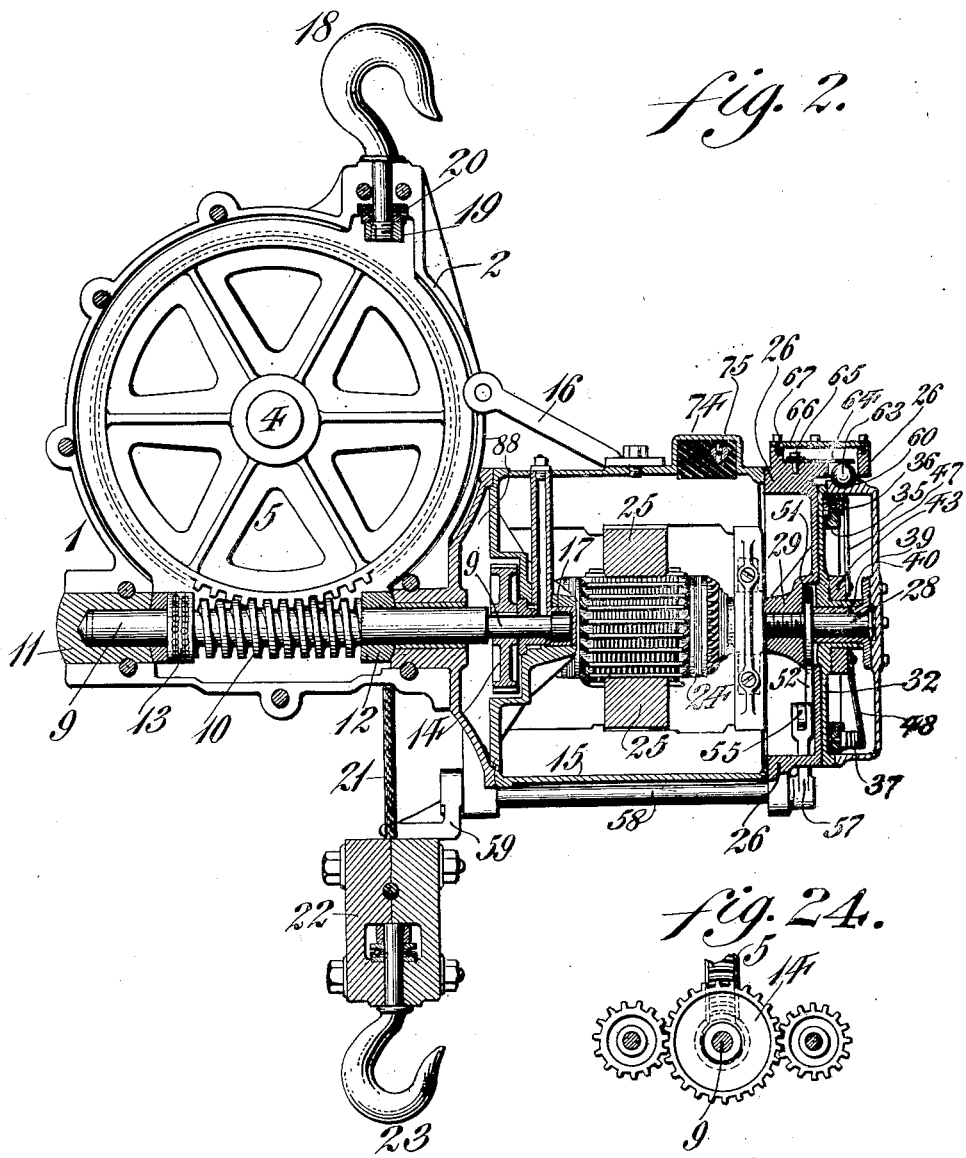
Figure 3:
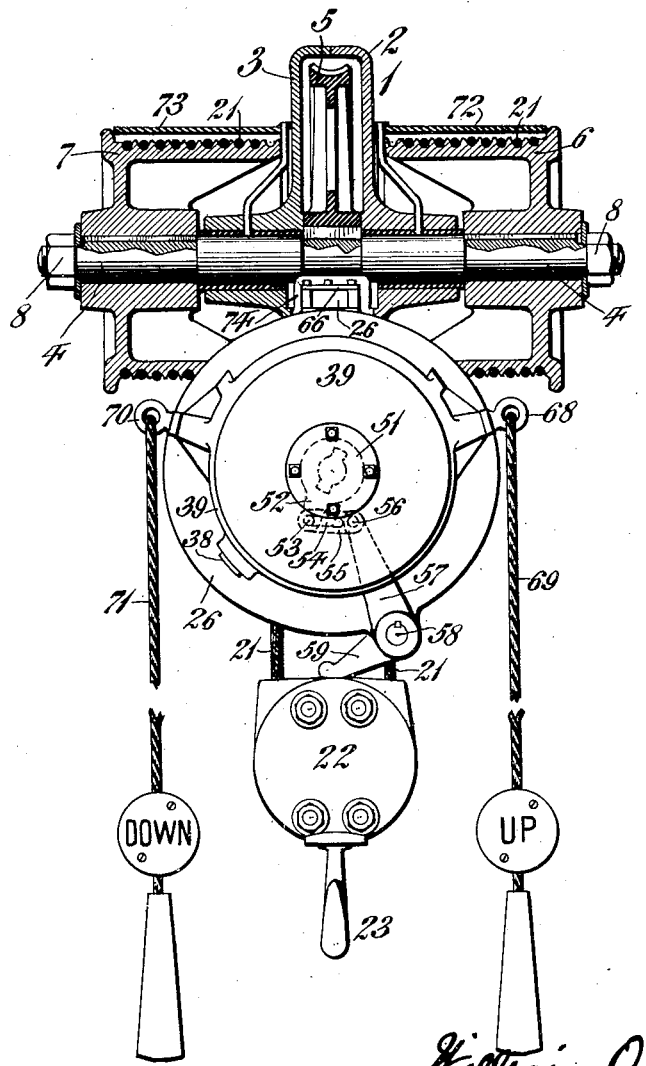
Figure 4:
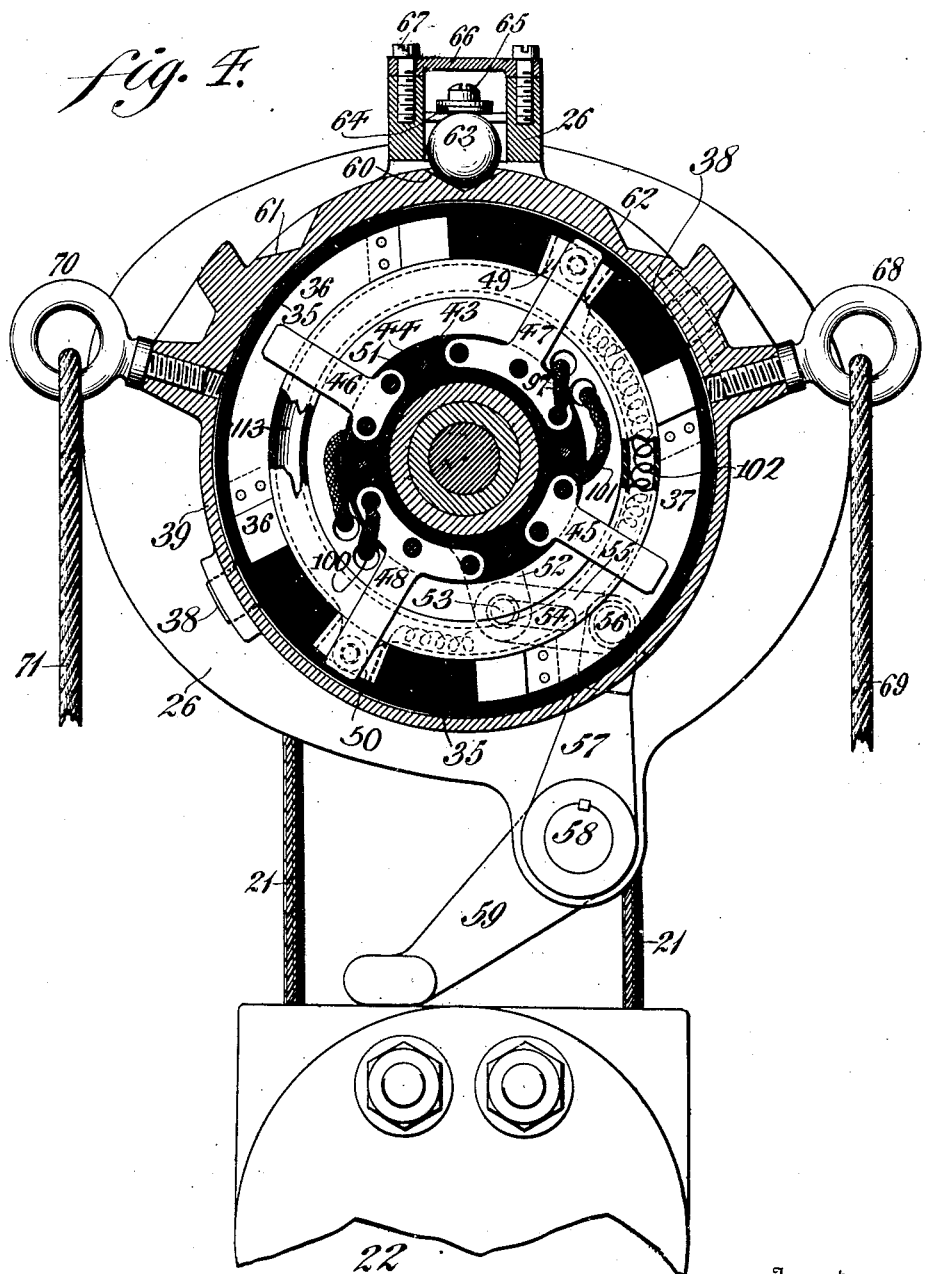
Figure 5:
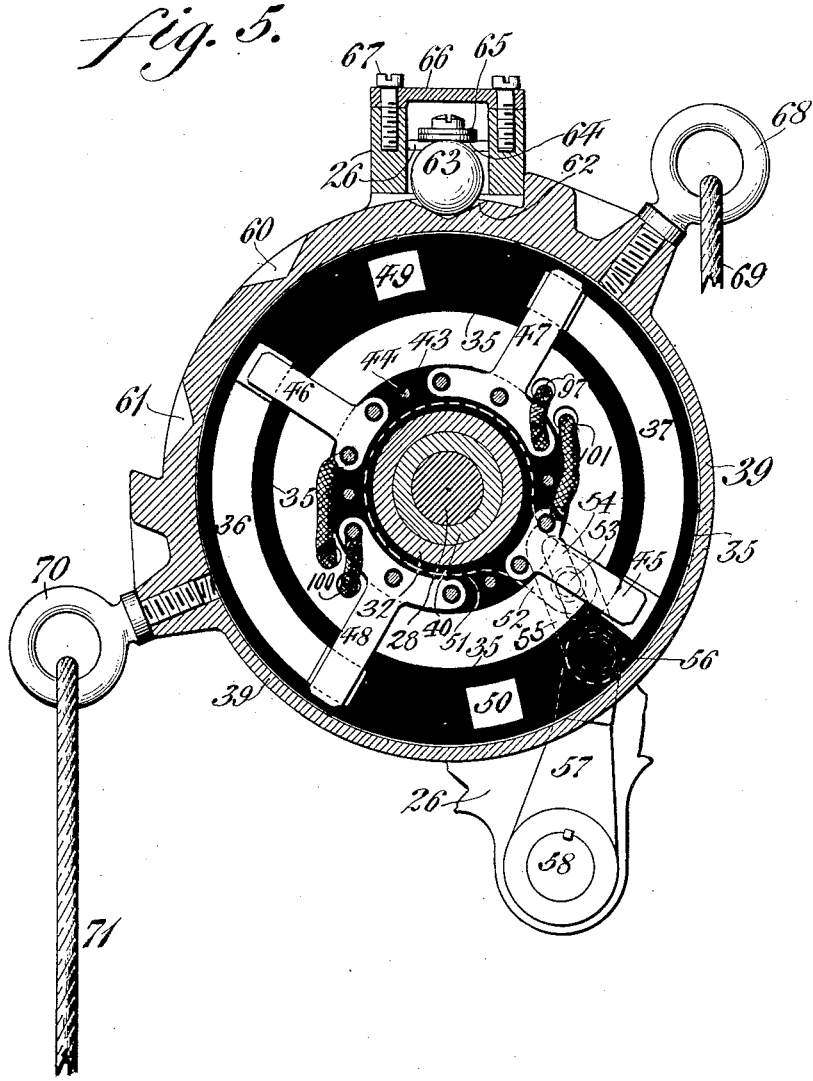
Figure 6:
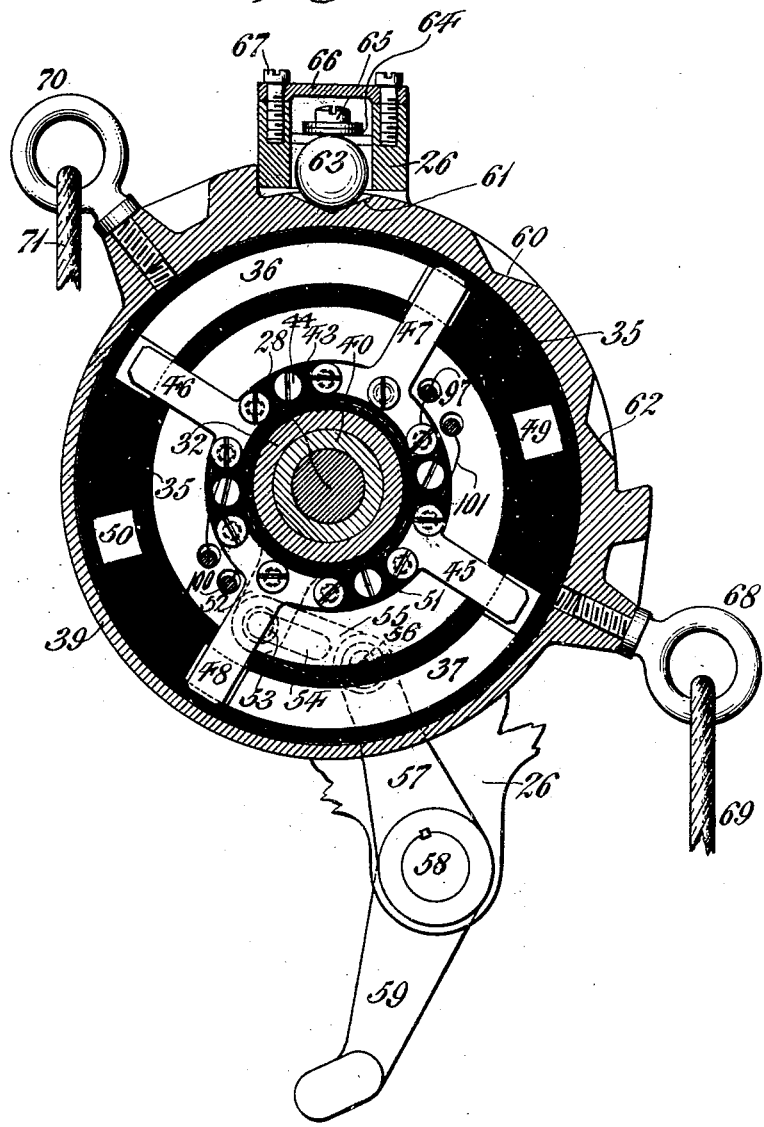
Figure 7:
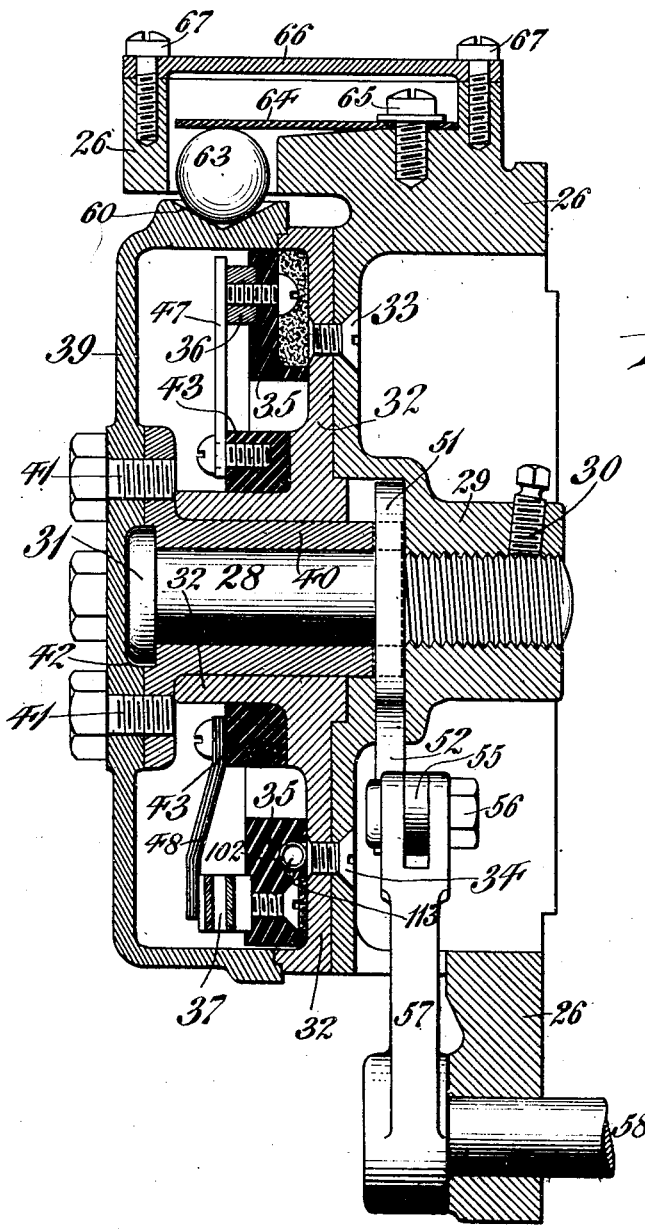
Figure 8:
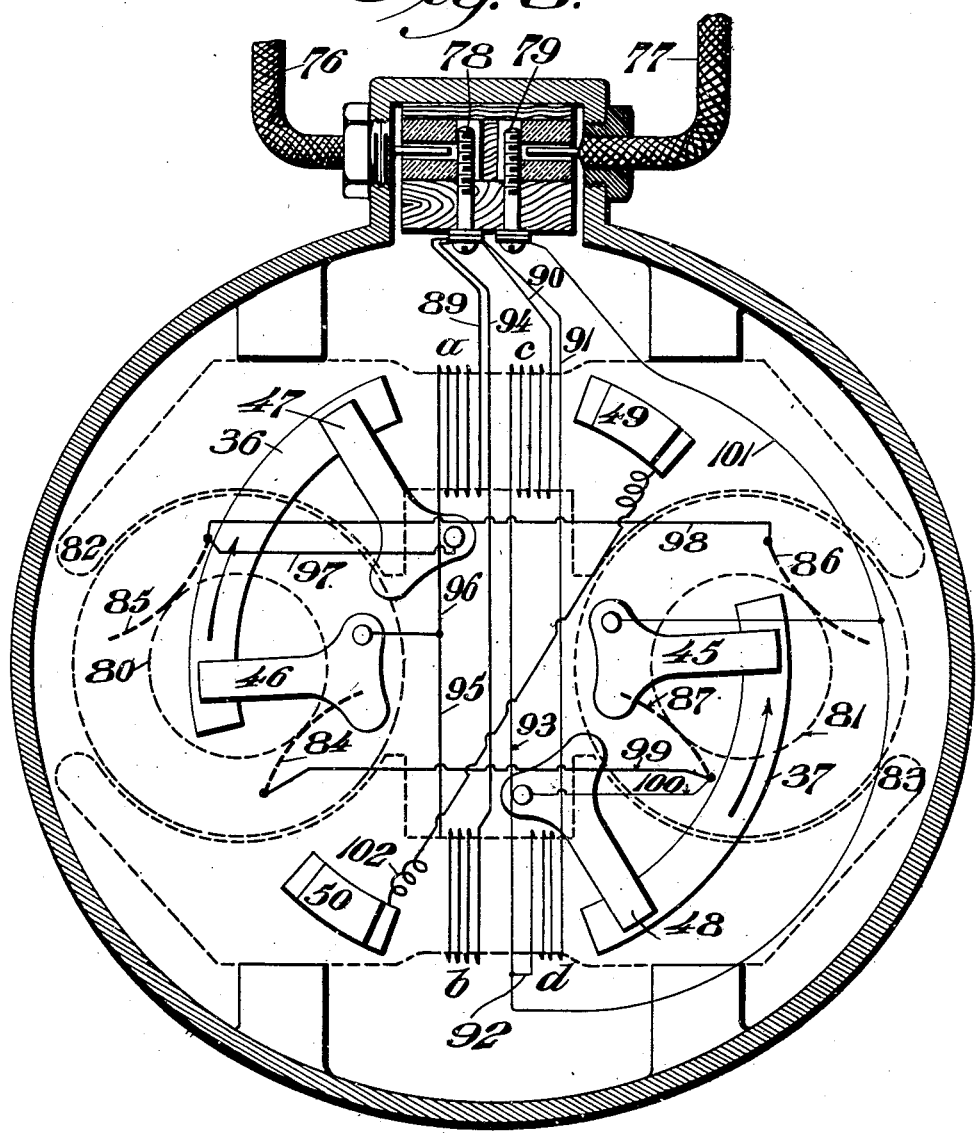
Figure 9:
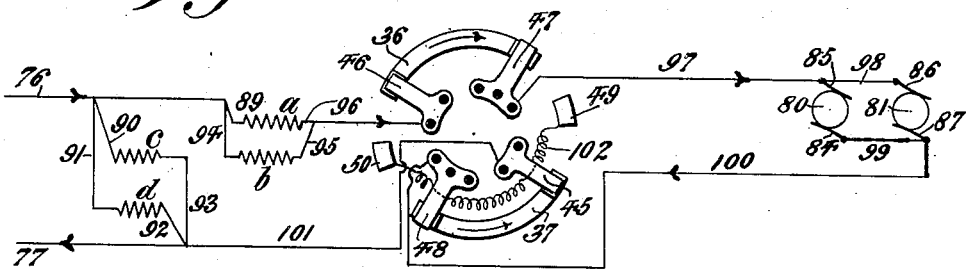
Figure 10:
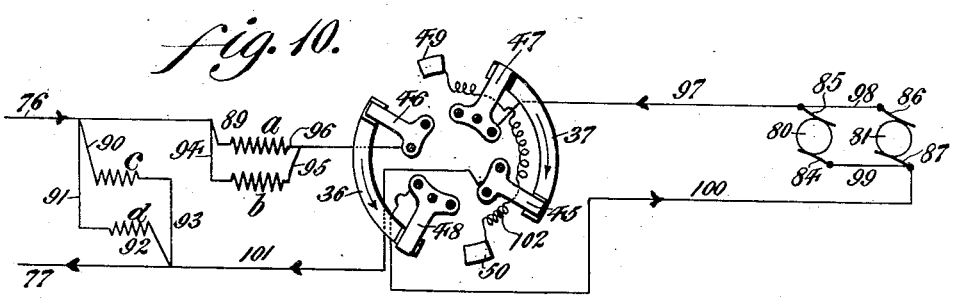
Figure 11:
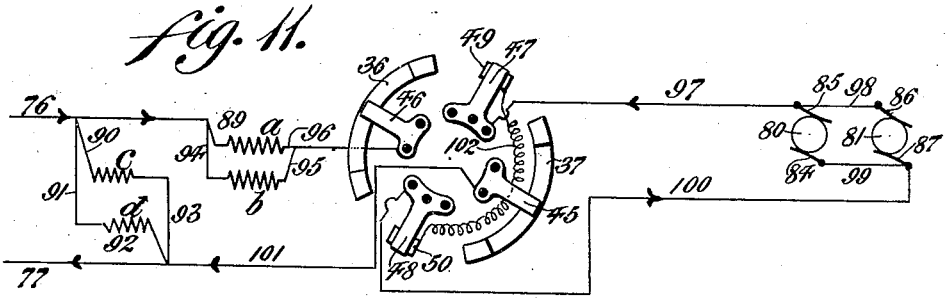
Figure 12:
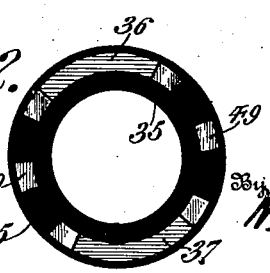
Figure 17:
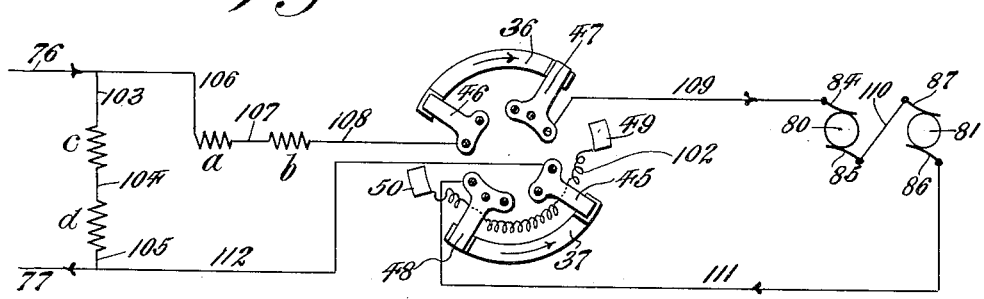
Figure 18:
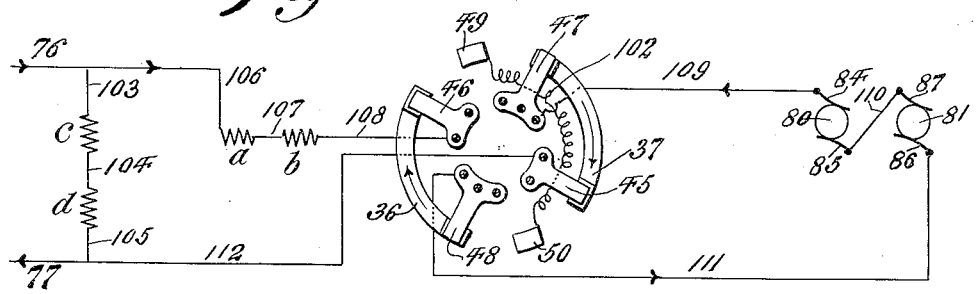
Figure 19:
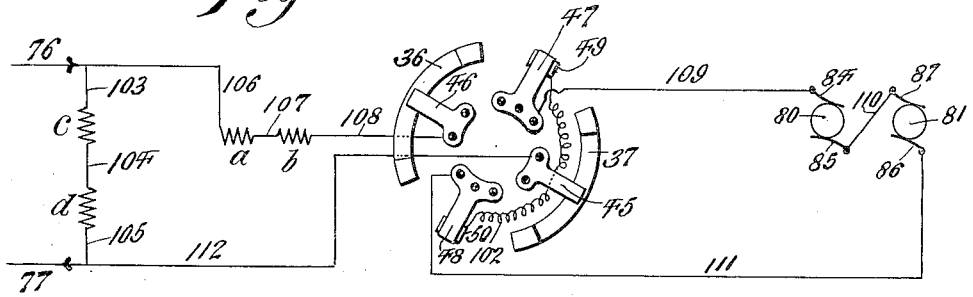
Figure 23:
Figure 25:
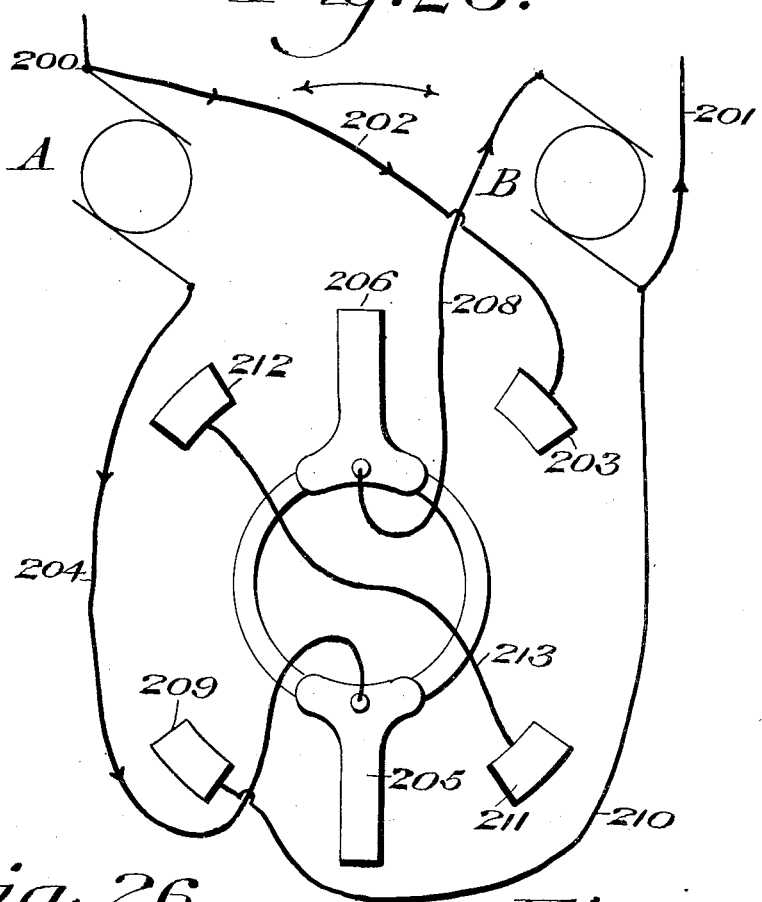
Figure 26:
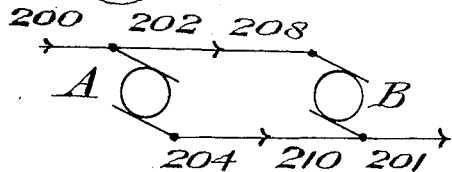
Figure 27:
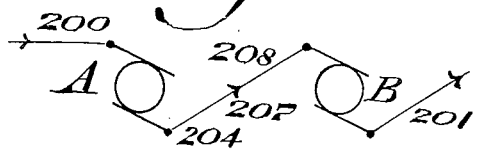

Figure 1 represents a perspective view of a two motor electric hoist embodying my invention. Fig. 2 represents a sectional elevation of my device, certain parts thereof being removed for the sake of clearness of illustration. Fig. 3 represents a front elevation of Fig. 2 partly in transverse section. Fig. 4 represents an enlarged sectional elevation of a portion of the hoist showing more clearly certain parts of the controlling mechanism when the hook block is stationary. Fig. 5 represents an enlarged sectional elevation showing certain of the parts seen in Fig. 4 when the hook block is going up. Fig. 6 represents an enlarged sectional elevation showing certain of the parts seen in Fig. 5 when the hook block is going down. Fig. 7 represents a sectional view of Fig. 4, certain parts being removed for the sake of clearness of illustration. Fig. 8 represents a diagrammatical view showing the connections for a circuit of 110 volts. Fig. 9 represents a diagrammatical view of the wiring for 110 volts when the hook block is being raised. Fig. 10 represents a diagram of the wiring for 110 volts when the hook block is being lowered. Fig. 11 represents a diagram of the wiring for 110 volts when the hook block is stationary and the dynamic brake is applied. Fig. 12 represents a plan view of the insulated ring showing the contacts thereon. Fig. 13 represents a diagrammatical view in simplified form showing the wiring for 110 volts when the hook block is going up. Fig. 14 represents a diagram of the wiring for 110 volts, in a simplified form, when the hook block is going down. Fig. 15 represents a diagrammatical view showing the wiring for 110 volts when the hook block is stationary and the dynamic brake is being applied. Fig. 16 represents a diagrammatical view of the wiring for 220 volts when the parts are in their neutral position. Fig. 17 represents a diagram of the wiring for 220 volts when the hook block is being raised. Fig. 18 represents a diagram of the wiring for 220 volts when the hook block is being lowered. Fig. 19 represents a diagram of the wiring for 220 volts when the hook block is stationary and the dynamic brake is being applied. Fig. 20 represents a diagram, in simplified form, of the wiring for 220 volts when the hook block is going up. Fig. 21 represents a diagram, in simplified form, of the wiring for 220 volts when the hook block is going down. Fig. 22 represents a diagram of the wiring for 220 volts when the hook block is stationary and the dynamic brake is being applied. Fig. 23 represents a plan view of the stationary contact member and its contacts. Fig. 24 represents, in detail elevation, the pinions of the armature shafts meshing with a common pinion forming part of the transmission mechanism. Figs. 25, 26 and 27 show diagrammatically the electrical connections for attaining two speeds.

Similar numerals of reference indicate corresponding parts in the figures.

Referring to the drawings, in order to more clearly describe my invention, I will describe in sequence the hoist proper, the manner in which it is connected with the motors, the electric motors, the switch mechanism for controlling the motors and the wiring for different voltages.

1 designates the hoist frame or casing comprising in the present instance the casing members 2 and 3 which are adapted to be secured together by any suitable fastening devices.

4 designates the drum shaft journaled in the members 2 and 3 and on which is mounted the worm wheel 5, it being noted that said wheel is completely inclosed in the present instance by the casing members 2 and 3.

6 and 7 designate drums mounted on the shaft 4 on opposite sides of the worm wheel 5, said drums being maintained in assembled position by means of nuts or equivalent fastening devices 8.

9 designates the worm shaft having the worm 10 thereon which meshes with the worm wheel 5, said shaft being journaled in bearings 11 and 12 carried by the casing 1, it being noted that in the present instance a suitable ball bearing or antifriction device 13 is provided, as is most clearly indicated in Fig. 2 of the drawings; similar antifriction means may be provided in journal 12.

In my present construction, the worm is adapted to be driven by two motors and the pinion 14 meshes with a pinion on each armature shaft, as is clearly seen in Fig. 24.

15 designates the motor casing which is secured with respect to the casing 1 in any suitable manner and in the present construction a brace 16 is preferably employed, one end of which is secured to the casing 15, the other end thereof being secured to the casing 1.

17 designates a bearing suitably carried by the casing 15 and in which one end of the worm shaft 9 is journaled.

18 designates the upper hook which passes through an apertured portion of the casing 1 and is suitably secured with respect thereto by means of a nut or equivalent fastening device 19, it being noted that a ball bearing or antifriction device 20 is interposed between the nut 19 and the casing 1.

21 designates a cable which is secured to the drums 6 and 7 and passes through the block 22 in which is secured the hook 23 in a manner similar to that already described with reference to the upper hook 18.

24 designates one of the armatures and 25 designates the field therefor, it being understood that in the present instance, two armatures are employed, the shafts of which are suitably journaled within the casing 15.

26 designates the casing for the controlling mechanism, which is secured to the casing 15 by means of suitable fastening devices such as the bolts 27.

28 designates a shaft which, as most clearly seen in Fig. 7, has threaded engagement with the enlargement 29 of the member 26, any improper movement being prevented by means of the lock nut 30, it being noted that the shaft 28, has at its outer end, an enlargement 31, the purpose of which will hereinafter appear.

32 designates a collar which is secured to the member 26 by means of the fastening devices 33 and 34.

35 designates a ring of insulating material movably mounted on the stationary member 32 and to which the different contacts are secured.

36 designates a contact piece secured to the ring 35, and 37 designates another contact piece which is secured to the member 35, it being noted, as most clearly seen in Fig. 4, that the ring 35 has an extension or lug 38 at its outer periphery which when the parts are in assembled position is adapted to be seated in suitable recesses in the bonnet 39, whereby said ring 35 and bonnet 39 move in unison. The bonnet 39 has secured thereto a bushing 40 by any suitable means such as the fastening devices 41. Both the bonnet 39 and the bushing 40 are recessed, as indicated at 42, in order that the enlarged head 31 of the shaft 28 may be seated therein when the parts are assembled and thus prevent any improper lateral movement of said bushing 40 and bonnet 39 with respect to the shaft 28.

43 designates a stationary ring of insulating material secured by means of suitable fastening devices such as screws 44 to the stationary member 32, said ring 43 having secured thereto the spring contacts 45 and 46 and the contact blades 47 and 48. The movable ring 35 has secured thereto the negative contact pieces 49 and 50.

51 designates a collar fixed to the bushing 40 in any suitable manner and having an extension 52 in which a stud 53 is mounted which is adapted to engage a slot 54 in the link 55, which latter is pivoted at one end as at 56 to a rock arm 57 mounted on a rock shaft 58 to which latter is also secured a rock arm 59 which is located in the path of the hook block 22, as will be best understood by reference to Figs. 4 and 7.

60, 61 and 62 designate recesses or seats in the bonnet 39 in which the ball 63 is adapted to be seated at certain times to prevent improper rotation of the bonnet 39. As seen in Fig. 7, the ball 63 is maintained in place by means of the engagement therewith of the free end of a spring 64, said spring being secured at 65 to the stationary member 26.

66 designates a casing or cover secured by means of suitable fastening devices such as the screws 67 to the stationary member 26, whereby any foreign material is prevented from coming into contact with the ball 63.

68 designates a hook to which a cord 69 is secured, said cord being provided with a suitable handle and also, if desired, with a disk showing the direction in which the cord is actuated to operate the hoist.

70 designates a hook similar to the hook 68 and secured to the bonnet 39, said hook having secured thereto an actuating cable or cord 71 provided with a suitable actuating handle and also, if desired, with a disk showing the direction in which said cord is to be actuated.

It will be readily seen that, if desired, any suitable antifriction means could be provided for to relieve the friction when manipulating bonnet 39 and ring 35.

72 and 73 designate drum covers which are secured to the casing members 2 and 3 respectively.

The casing 15 is deflected as indicated at 74 in Fig. 2 and provided with lateral apertures 75 through which the line wires pass. By this construction the liability of any moisture or dampness entering the motor casing is reduced to a minimum.

It is to be especially noted that owing to the manner in which the motor casing 15 is connected with the casing 1 of the hoist proper a chamber 88 is formed in which is located the pinion 14 and the pinions in the different armature shafts, it being understood that this chamber is adapted to contain any suitable lubricating material such as a thick grease, whereby the parts will be properly lubricated under all conditions and there is no liability of any of the lubricating material passing to the different motors since, as above stated, the pinions and gears are located in a separate chamber. A chamber is also formed in the casing 1 in which the worm is journaled and which may be filled with any suitable lubricating material in order that the worm and the worm wheel will be properly lubricated at all times.

Referring now to Figs. 8 to 15 inclusive, I will describe the manner in which the circuit is formed when 110 volts are employed and also show the manner in which the different circuits are formed during the different positions of the switch. I will explain the manner in which the circuits are formed when the hoist is going up, the manner in which the circuit is formed when the hoist is going down and third, the manner in which the hoist is brought to rest and maintained in a stationary position.

76 and 77 designate the different line wires which lead to the binding posts 78 and 79 respectively. In the present instance I have shown two commutators 80 and 81 as being employed, in conjunction with which is used a novel construction of fields 82 and 83.

84 and 85 designate brushes for the commutator 80 and 86 and 87 designate brushes for the commutator 81.

89 designates a wire leading from the binding post 78 and passing around the field 82, thence by wire 96 across to join wire 95 and thence to spring contact 46, the other series wire 94 in parallel therewith, passing around the pole piece 83 and thence by wire 95 to join wire 96 and finally to spring contact 46. The wire 90 of the shunt field passes around the field 82, thence joins wire 101 by wire 93, and finally to binding post 79. The wire 91 in parallel with wire 90 passes around pole piece 83, thence by wire 92 joins wire 93, and finally to binding post 79. The brush 85 is connected by the wire 97 with the contact blade 47. The brush 85 is also connected by means of the wire 98 with the brush 86. The brush 84 is connected by the wire 99 with the brush 87 and the brush 87 is connected by the wire 100 with the contact blade 48. The spring contact 45 is connected by means of the wire 101 to the binding post 79.

102 designates a short circuiting or low resistance wire leading from the neutral contact 49 to the neutral contact 50. This wire is located in a groove 113 in the ring 35 and is embedded in suitable insulating material, as will be clearly understood from Figs. 4 and 7.

I will now explain the manner in which the circuit is formed when the hoist block is going up, which will be clearly understood from Fig. 9. The current passes through the line wire 76 to the wire 89 of the "a" series field by the wire 96 and also through wire 94 of the "b" series field to the wire 95, thence to the spring contact 46 and since the parts are now in the position indicated in Fig. 9, the current will flow from the spring contact 46 to the contact 36 carried by the movable ring 35, thence through the contact blade 47 to the wire 97 to the brush 85, which is connected by the wire 98 to the brush 86, thus passing through the armatures in parallel. The current passes through the brushes 84 and 87 and by means of wires 99 and 100 to the contact blade 48, thence through the contact 37 to the spring contact 45, thence through the wire 101 to the line 77, it being understood that the line wires 76 and 77 are connected by the shunt, circuits 90, 93 and 91, 92, thereby connecting the shunt fields in parallel. The shunt circuit comprising the wire 90 passes through "c" shunt field and is connected by the wire 93 with the line 77 and the other shunt circuit passes through the wire 91 to the "d" shunt field and connects by means of the wire 92 with the line wire 77.

The above shows the shunt fields coupled in parallel, and the series fields and armatures also in parallel with each other.

In Fig. 10, I have indicated the manner in which the current passes when the motors are reversed. The current from the wire 76 passes by the wire 89 through "a" series field to the wire 96 and passes by means of the wire 94 and the "b" series field to the wire 95, the wires 95 and 96 being connected with the spring contact 46 which is in engagement at this time with the movable contact 36, so that the current passes from the contact 36 to the contact blade 48 thence by the wire 100 to the brush 87 and by the wire 99 to the brush 84. The current then passes from the brushes 86 and 85 by means of the wires 98 and 97 to the contact blade 47, which in this position is in engagement with the movable contact 37 and since the spring contact 45 at this time is in engagement with the movable contact 37, the current will pass to the spring contact 45 and therefrom by means of the wire 101 to the line 77. The shunt fields "c" and "d" are excited by current taken from line 76 to wire 90 which then passes through "c" field and communicating by means of 93 with the line 77 and by means of the wire 91 passes through the "d" shunt field and communicates by means of the wire 92 with the line 77. In this position the only change between that seen in Fig. 9 is that the current is furnished to the armatures in the opposite direction.

When it is desired to stop the motors the ring 35 is moved to the position seen in Fig. 11 at which time the series field is opened, the shunt field remaining active, the armatures are short circuited and the current flows from brushes 85 and 86.

The current passes from the brushes 85 and 86 by way of the wire 97 to the contact blade 47, thence to a neutral contact 49 by wire 102 and neutral contact 50, thence to the spring 48 and thence to the armatures by way of wires 100 and 99.

In the diagrammatical views seen in Figs. 13 to 15, inclusive, I have shown in a more simplified form the manner in which the circuit is formed when the switch is in each of its three positions, corresponding to Figs. 9, 10 and 11, respectively. It will be noted that the simplification is made by omitting the showing of the switch *per se*.

In Figs. 16 to 22 inclusive, I have shown the manner in which the different circuits are formed when the hoist is being used with 220 volts.

The only changes in the method of connection in case a circuit of 220 volts is employed, are that the armatures and fields are arranged in series with each other instead of parallel with each other as used in the 110 circuit. The detail connections necessary to effect this arrangement will be clear from the description of Figs. 16 to 22 which follows.

It is within the scope of my invention to provide my device with a simplified connecting switch whereby the various changes in the connections are readily made without dismantling the bonnet. This feature will be described in detail later.

In Fig. 17, I have shown the manner in which the parts are electrically connected when the motors are running in a direction to cause the foot block to be raised. The current passes from the wire 76 by wire 106 through the "a" series field, then by wire 107 to the "b" series field, then by wire 108 to the spring contact 46, thence by contact 36 to the contact blade 47, thence by wire 109 to brush 84. The current now passes from brush 85 by wire 110 to brush 87 and thence from brush 86 by wire 111 to contact blade 48, thence by contact 37 to spring contact 45, thence by wire 112 to line 77. The shunt field derives its current from line 76 from wire 103, through "c" field, then by wire 104 through "d" field, then by wire 105 to line 77. This position gives us the shunt fields in series with each other, the series fields in series with each other and the armature in series, thus using the same electrical parts in 220 volts as used on 110 volts circuit.

In Fig. 18, I have indicated the manner in which the parts are electrically connected when the members are reversed and the foot block is being lowered. The current enters by line 76, passes by wire 106 through "a" series field, thence by wire 107 to "b" series field, thence by wire 108 to spring contact 46. The current passes from spring contact 46 by removable contact 36, thence to contact blade 48 to wire 111 and thence to brush 86. The current now passes from brush 87 by wire 110 to brush 85, thence by brush 84 by wire 109 to contact blade 47, thence by movable contact 37 and spring contact 45 by wire 112 to line 77.

The current in the shunt field passes from line 76 by wire 103 to "c" field, thence by wire 104 through "d" shunt field, and thence by wire 105 to line 77.

The only change between the views shown in Fig. 18 and that seen in Fig. 17 is that the armatures receive their current in the opposite direction.

When it is desired to stop the motors, the ring 35 is moved to the position seen in Fig. 19 in which position the series field is open, the shunt field remaining active, the armatures are short circuited and the current flows from the brush 84 by wire 109 to spring contact 47, thence to neutral contact 49, by wire 102 to the neutral contact 50, spring contact 48, wire 111, brush 86 to brush 87 by wire 110 to brush 85, to brush 84.

I will now explain how the connections are made when it is desired to operate my hoist with two speeds. As will be seen from Figs. 25, 26 and 27 the switch is similar to that described above, excepting that the switch blades are moved and the contacts are stationary. It is to be noted that the armatures of the motors are wound for maximum voltage.

Referring particularly to Fig. 25, 200 and 201 represent the electrical supply wires. Wire 200 is connected directly with one brush of one armature, designated A, supplying current thereto; wire 200 also makes connection with fixed contact 203. Current is led from the other brush of motor A by wire 204 to one of the movable contact blades 205. Contact blade 206 is connected with one brush of the motor B by wire 208. The other brush of motor B is in connection with line 201 and also with fixed contact 209 by wire 210. The opposite fixed contacts 211 and 212 are short circuited by coil 213.

When it is desired to use the low speed the movable blades are rotated anti-clockwise so that blade 206 contacts with 212 and blade 205 with 211. The armatures of motors A and B are thus connected for low speed, as shown more clearly in Fig. 27.

When a high speed is desired the contact blades are rotated clockwise and the current passes in parallel through the armature circuits by connections 200, 202, 206, 208 and thence by 201.

In so far as I am aware, I believe that I am the first in the art to devise the combination of a plurality of motors having common field cores, a plurality of armatures, means for maintaining a constant direction of flux through the cores and means for controlling the direction of current flow through the armatures. In addition, I believe it is novel with me to devise a plurality of motors to simultaneously drive by suitable gear a common shaft and thereby actuate the winding mechanism.

In so far as I am aware, I am the first in the art to devise an electric hoist in which a plurality of motors are employed and in which a series field is employed which is common to both armatures and it is to be understood that my claims to these features are to be interpreted with corresponding scope. By this arrangement of a plurality of motors, I am enabled to get a higher speed than by the usual construction, since the small diameters of the motors enable them to be run at high speeds.

Furthermore, it will be seen that I derive great advantages in my electric hoist by employing a worm and worm shaft intermediate the hoisting means and gearing of my motors, especially in combination with electrical means for effecting a dynamic brake, specifically by maintaining a flux through the field cores and short-circuiting the armature circuits.

Attention is again directed to the plurality of winding drums located upon either side of a gear and all upon a common shaft, whereby a compact hoisting mechanism is obtained which receives its power directly at the lifting point and furthermore a structure is provided particularly well adapted for portability.

It will now be apparent to those skilled in this art that I have devised a novel and useful construction of electric hoist which embodies the features of advantage enumerated as desirable in the statement of invention and the above description and while I have, in the present case, shown and described the preferred embodiment thereof which has been found in practice to give satisfactory and reliable results, it is to be understood that it is susceptible of modification in various particulars without departing from the spirit and scope of the invention or sacrificing any of its advantages.

Having thus described my invention, what I claim as new and desire to secure by Letters Patent, is:—

1. In a device of the character described, a plurality of winding drums, a driving shaft actuating said drums, a motor casing, a plurality of motor armatures, a field magnet common to said armatures, transmission gearing for said armatures, an auxiliary shaft secured to said motor casing, a plurality of contacts mounted on said auxiliary shaft, and means for shifting said contacts.

2. In a device of the character described, a plurality of winding drums, a driving shaft actuating said drums, a motor casing, a plurality of motor armatures, a field magnet common to said armatures, transmission gearing for said armatures, an auxiliary shaft secured to said motor casing, a plurality of contacts mounted on said auxiliary shaft, and automatic means for shifting said contacts.

3. In a device of the character described, a plurality of winding drums, a driving shaft actuating said drums, a motor casing, a plurality of motor armatures, a field magnet common to said armatures, transmission gearing for said armatures, an auxiliary shaft secured to said motor casing, a plurality of contacts mounted on said auxiliary shaft, a casing for said contacts, a trip arm adapted to shift said contacts, and means to lock said contacts in shifted position.

4. In a device of the character described, a hoisting mechanism, a shaft operating said hoisting mechanism, a plurality of motors, a motor casing, shafts for said motors extending outside of said motor casing, intermediate gears upon the hoisting shaft, a shaft secured to said motor casing, a plurality of contacts mounted on said shaft, a casing for said contacts, and means to shift said contacts.

5. In a device of the character described, a hoisting mechanism, a shaft operating said hoisting mechanism, a plurality of motors, a motor casing, shafts for said motors extending through said motor casing, intermediate gears upon the hoisting mechanism shaft, and upon the motor shafts, an auxiliary shaft secured to said motor casing, a plurality of contacts mounted on said auxiliary shaft, a casing inclosing said contacts, and automatic means for shifting said contacts.

6. In a device of the character described, a hoisting mechanism, a shaft operating said hoisting mechanism, a plurality of motors, a motor casing, shafts for said motors, intermediate gears upon the hoisting mechanism shaft and upon the motor shafts, an auxiliary shaft secured to said motor casing, a plurality of contacts on said auxiliary shaft, a casing for said contacts, a trip arm adapted to shift said contacts, and means to lock said contacts in shifted position.

7. In a device of the character described, a hoisting mechanism, a shaft operating said hoisting mechanism, a plurality of motors, a motor casing, shafts for said motors, intermediate gears upon the hoisting mechanism shaft and upon the motor shafts, an auxiliary shaft, secured to said motor casing, a disk having a plurality of contacts mounted on said shaft, a casing for said disk, connections between said disk and casing, arms on said casing whereby said disk may be shifted, and means to lock said disk in shifted position.

8. In a portable electric hoist, one or more drums, a driving shaft actuating said drums, a casing, a plurality of motor armatures, a field magnet common to said armatures, power transmission means symmetrically mounted with respect to said shaft, and an oscillating bonnet on said casing for electrically controlling the rotation of said armatures.

9. A portable electric hoist adapted to be suspended, a plurality of winding drums, a driving shaft actuating said drums, a casing, a plurality of motor armatures, a field magnet common to said armatures, transmission gearing for said armatures, an oscillating bonnet on said casing for electrically controlling the rotation of said armatures, a plurality of arms on said bonnet for manual operation thereof, and a trip arm for automatic operation of said bonnet.

10. In a portable electric hoist, a casing, a drum shaft therein, drums adapted to be driven by said shaft, a plurality of motors, a transmission gearing adapted to drive said shaft and symmetrically arranged in said casing relative to said shaft, a contact disk supported in said casing, and means to lock said disk.

11. In a portable electric hoist, a casing, a drum shaft therein, drums adapted to be driven by said shaft, a plurality of motors, a transmission gearing adapted to drive said shaft and symmetrically arranged in said casing relative to said shaft, a contact disk secured to said casing, means to oscillate said contact disk, and means to hold said disk in fixed position.

12. In a portable electric hoist, a casing, a drum shaft therein, drums adapted to be driven by said shaft, a plurality of motors, a transmission gearing adapted to drive said shaft symmetrically arranged in said casing, relative to said shaft, a contact disk supported by said casing, a ring inclosing said disk, means to oscillate said disk and ring together, and means to hold said ring in fixed position.

13. In a portable electric hoist, a winding device, a shaft to which said winding device is secured, a gear fast on said shaft, a driving shaft mounted in suitable bearings located below said gear and winding device, a worm on said driving shaft in mesh with said gear, a gear mounted on said driving shaft, pinions engaging said last mentioned gear, a plurality of shafts on which said pinions are mounted, a plurality of armatures carried by said last mentioned shafts, the latter and said armatures being located below said drums, and a field magnet common to said armatures.

14. In a portable electric hoist, a winding device, a shaft to which said winding device is secured, a gear fast on said shaft, a housing for said gear, suspension devices carried by said housing, a driven shaft mounted in suitable bearings located below said gear and winding device, a worm on said driving shaft in mesh with said gear, a gear mounted on said driving shaft, pinions engaging said last mentioned gear, a plurality of shafts on which said pinions are mounted, a plurality of armatures carried by said shafts and located below said winding device, and a field magnet common to said armatures.

15. In a portable electric hoist, a plurality of drums, a shaft to which said drums are secured, a gear also fast on said shaft and located intermediately of said drums, a driving shaft mounted in suitable bearings located below said gear and drums and having a worm thereon in mesh with said gear, a gear mounted on said driving shaft, pinions engaging said last mentioned gear, a plurality of armatures also located below said drums, connections intermediate said armatures and pinions, and a field magnet common to said armatures.

16. In a portable electric hoist, a plurality of drums, a shaft to which said drums are secured, a gear also fast on said shaft and located intermediately of said drums, a driving shaft mounted in suitable bearings located below said gear and drums and having a worm thereon in mesh with said gear, a gear mounted on said driving shaft, pinions engaging said last mentioned gear, a plurality of armatures also located below said drums, shafts for said armatures on which said pinions are mounted, and a field magnet common to said armatures.

WILLIAM O. DUNTLEY.

Witnesses:
S. W. PRINCE,
W. S. JACKSON.